United States Patent [19]

Frey et al.

[11] Patent Number: 4,881,344

[45] Date of Patent: Nov. 21, 1989

[54] SLEEVE FOR PLANT GERMINATION SUBSTRATE

[75] Inventors: Günter Frey, Schliengen; Rudolf Wagner, Heitersheim, both of Fed. Rep. of Germany

[73] Assignee: Firma Carl Freudenberg, Weinheim/Bergstr., Fed. Rep. of Germany

[21] Appl. No.: 316,087

[22] Filed: Feb. 27, 1989

[30] Foreign Application Priority Data

Mar. 12, 1988 [DE] Fed. Rep. of Germany ....... 3808320

[51] Int. Cl.⁴ ............................................. A10G 9/02
[52] U.S. Cl. ......................................... 47/77; 47/74; 47/84
[58] Field of Search ................... 47/73, 74, 75, 76, 77, 47/78, 84

[56] References Cited

U.S. PATENT DOCUMENTS

| | | |
|---|---|---|
| 2,688,209 | 9/1954 | Adams ................................... 47/74 |
| 2,728,169 | 12/1955 | Spengler ................................ 47/78 |
| 3,901,838 | 8/1975 | Clendinning ....................... 47/74 X |
| 4,016,678 | 4/1977 | Larsen ..................................... 44/77 |
| 4,333,265 | 6/1982 | Arnold ................................... 47/74 |
| 4,369,599 | 1/1983 | Franclet et al. ..................... 47/77 X |
| 4,517,764 | 5/1985 | Dedolph ................................ 47/77 |

FOREIGN PATENT DOCUMENTS 54-10107 1/1979 Japan ..................................... 47/77

*Primary Examiner*—David A. Scherbel
*Assistant Examiner*—Jerrold D. Johnson
*Attorney, Agent, or Firm*—Felfe & Lynch

[57] ABSTRACT

A tubular sleeve for a plant germination substrate consists of a a polymer mass and nonwoven, bonded fiber material treated with fungicides, in which cellulose fibers predominate. The rest of the synthetic fibers have a size of 1.3 to 17 dtex and give the fiber material a porosity of 1000 to 1600 l/s.m² (air passage at 1.0 mbar). The fiber material is bonded by a binding agent and additionally contains fertilizer embedded in the polymer mass.

9 Claims, No Drawings

4,881,344

SLEEVE FOR PLANT GERMINATION SUBSTRATE

FIELD OF THE INVENTION

This invention relates to a novel tubular sleeve adapted to contain a substrate for plant germination, said sleeve consisting of a nonwoven, bonded fiber material of 15 to 50 g/m² treated with amounts of 0.1 to 3 g/m² of a fungicide and comprising a fertilizer.

BACKGROUND OF THE INVENTION

In recent years a high-production method has been developed for plant germination in large truck farms and large nursery operations for plant germination followed by automatic transplanting of the seedlings: sheet material made from nonwoven fabric or paper is cut into strips and formed into a sleeve with overlapping longitudinal edges. The sleeve is filled by means of a proportioning apparatus with mixtures of peat, humus, sawdust and other aids commonly used in agriculture. These fillings, which vary greatly according to the type of plant and method of cultivation, will be referred to hereinafter as "substrates."

After the filling operation, the overlapping longitudinal edges are glued with a dispersion adhesive on a runner heated to 350° to 400° C. to form a tube. With a shearing device, sections 40 to 130 mm long are severed from the horizontally lying tube, the substrate is seeded and covered with chips of substrate or wood to retard drying. Conventional tubes have a diameter of 15 to 30 mm.

The seeded tube sections or cartridges are then placed into containers called flats, and cultivated in greenhouses for up to about 2 months, depending on the type of plant. During this germination phase the roots penetrate the sleeve material. Then the seedling are transplanted or shipped.

The sleeve material is strong enough for the transplanting operation; afterward it rots away so as not to interfere with further growth.

The use of such substrate tubes permits high production rates of as many as 1000 tube sections per minute.

Also, this method of germination saves time and substrate in comparison with conventional methods, and provides a cost advantage over manual methods. The smaller space which the tube sections occupy permits a high productivity per unit area, and lighter shipping weight and bulk are achieved. The uniform and stable substrate cartridges allow their easy removal from the germination flats, thus permitting automated transplanting. At the same time, gentle handling of the plants and root balls is assured. In a free-standing pot, very good formation of the seedlings is achieved.

One special advantage of this method of planting resides in the possibility of producing sleeves filled with substrate but unseeded for stock and then seeding them as needed. This offers the operator a high degree of flexibility and efficient utilization of machinery.

The method described above calls for certain processing and cultivation requirements.

Processing requirements (packaging).

Sufficient stiffness, stability of shape and flexibility of the sleeve material are necessary for optimum formation of the sleeve. For easy and trouble-free machinery operation the material should be as thin as possible and smooth.

Cultivation requirements:

During the germination phase of 5 to 12 weeks the sleeve must be rot-proof, that is, sufficiently stable in a moist environment. After transplanting or shipment and transportation the sleeve material must rot rapidly without additional chemical treatment, so as not to interfere with further root development and plant growth. It must not produce any residues harmful to the plant.

The sleeve is to hold the roots together without, however, constituting an impenetrable barrier for the roots; that is, sufficient porosity and good wet strength are required of the material. The ability to retain moisture is important (high water absorbency). The common specific weights of sleeve materials consisting of paper or nonwovens amount to 15 to 50 g/m².

To prevent fungal attack (mildew formation) the sleeve material must be treated with a fungicide. This treatment also prevents the premature decomposition of the sleeve when it has to be stored for long periods of time before actual use.

The known sleeves have the following disadvantages:

The gluing of the sleeve with dispersion adhesives on the heated runner requires a short-term heat stability up to 400° C. In the case of seaming of thermoplastic sheet material without a dispersion adhesive, the seam must be tight and long-lasting.

These requirements are only partially satisfied by the known sleeves, since thermal decomposition of the plastic compositions leads to brown or black seams, and the material thus degraded does not produce reliable seams.

The fungicidal preparations heretofore used made it unnecessary to add them to the sprinkling water, but they have proved to be unstable during the heating of the seams, so that the entire seam area became subject to fungus attack.

The sleeve materials heretofore used were mainly cigarette papers which have too little wet strength. Teabag papers and coffee filters have insufficient life, that is, their decomposition in the moist substrate by humic acid, bacteria and fungi takes place very quickly. Nonwovens of primarily polyester or polypropylene fibers produce only insufficiently tight seams when the sleeve is made with dispersion adhesives.

Fiber casing papers made of cellulosic fibers which are bonded with wet-strengthening agents are already in use in the vegetable sector. They withstand the short germination phases common in that sector, but they fail due to marked decomposition within 5 to 8 weeks. Production of such substrate cartridges for stock is not possible.

Another difficulty with the use of such cartridges is encountered in the addition of fertilizer. During the germination phase a slow-release fertilizing environment must be provided. The addition of a slow-release fertilizer with the sprinkling water is impossible under controlled conditions because of poor solubility; a uniform sprinkling mixture cannot be prepared. The addition of a slow-release fertilizer to the substrate is also very problematical on account of the great difference in specific weight between substrate and fertilizer. Homogeneous substrate mixtures cannot be produced (peat is specifically lighter).

OBJECT OF THE INVENTION

It is an object of the present invention to devise substrate sleeves which have the above-mentioned properties of the known products and additionally satisfy the following requirements which have heretofore not been met:

Heat resistance of the fiber material and fungicide for at least several seconds of exposure to 400° C.; uniform fertilizer distribution on or in the tube material with great freedom in setting the amount of the fertilizer; a tight and lasting seam resulting from the seaming of thermoplastic sheet material without dispersion adhesive; and uniform distribution of fungicide and fertilizer.

DESCRIPTION OF THE INVENTION

The satisfaction of these many processing and cultivation requirements is achieved by a sleeve for substrate cartridges having a tubular shape and being composed of a nonwoven, bonded fiber material which contains 50 to 80 wt.-% of cellulose fibers, 10 to 40 wt.-% of synthetic fibers with a size of 1.3 to 17 dtex, and 10 to 30 wt.-% of a fiber binding agent; is treated with amounts of 0.1 to 3 g/m$^2$ of a fungicide and with a polymer mass; has a porosity of 1000 to 1600 liters per second per square meter (air passage at 1.0 mbar); and additionally contains 10 to 50 grams per square meter of a slow-release fertilizer with a grain size of less than 80 microns embedded in the polymer mass.

The high cellulose fiber content of at least 50 wt.-% contributes to the stability at elevated temperature. Cellulose fiber contents above 80%, however, would cause the sleeve to rot too quickly (excessively short life). The porosity, measured at 1.0 mbar of air pressure, can easily be adjusted by experimentally mixing with synthetic fibers of a size of 1.3 to 17 dtex. Porosities of 1000 to 1600 l/s.m$^2$ have proved to be an ideal range.

The main point of the present invention is the presence of 10 to 50 g/m$^2$ of a slow-release fertilizer embedded in the polymer mass.

For incorporation into the sleeve material the fertilizer must have particle diameters below 80 microns in order to obtain pastes, dispersions or coating compositions for handling by machine.

Basically, two different types of slow-release fertilizers are known:

1. Water-soluble fertilizers encapsulated in a covering which is insoluble in water: the covering becomes more permeable with time due to biological processes, so that fertilizer can diffuse through it.
2. Organic nitrogen compounds of low solubility in water. Because of its low solubility the fertilizer is released in small doses over a relatively long time.

The fiber can be consolidated with conventional binding agents; suitable for this purpose are ethylene-vinyl acetate, acrylate, polyvinyl acetate, polyvinyl amide, starch, cellulose derivatives, epichlorhydrin resins, melamine formaldehyde and urea formaldehyde resins, individually or in combination. The amount to be applied should be 3 to 25 g/m$^2$.

A binding agent which has been found to be especially desirable is composed of a highly cross-linked acrylate and/or formaldehyde resin without an acid cross-linking catalyst, since the latter would undesirably catalyze thermal degradation during seaming. The selection of this binding agent thus surprisingly solves the temperature problems in making the seams (seam weakening due to degradation no longer occurs).

The nonwoven fabric or paper to be used in makig the substrate sleeve in accordance with the present invention can be made by the dry or the wet process by known methods. The best synthetic fibers are those made from polyester, polyvinyl alcohol, polyacetate or polyamide, provided they have a size between 1.3 and 17 dtex in order to achieve the appropriate porosity.

In a preferred embodiment of the sleeve of the present invention, the binding agent is a polyvinyl chloride or ethylene vinyl acetate copolymer which can be hot-sealed at 140° to 250° C. The sheet material can thus be made into a tubular sleeve without additional adhesive.

In another advantageous embodiment, the sleeve material contains, as the binding agent, thermoplastic heatsealable fibers on a copolyester or PVC basis having adhesive properties at 140° to 250° C. These fibers are present in the polymer mass in an amount of 10 to 30 percent by weight.

If a separate binding agent is used, it is advantageous to incorporate the fungicide and the fertilizer into the binding agent serving as the polymer mass. Conventional methods of application, however, are also possible, but not preferred, such as printing, soaking or spraying. 10 to 50 g/m$^2$ of the fertilizer and 0.1 to 3 g/m$^2$ of the fungicide have been found to be ideal amounts to apply.

Suitable known fungicides are inorganic copper compounds, sorbates, thiocarbamates and other sulfur-nitrogen heterocyclic substances.

The amount of fertilizer to be used depends upon the kind of plant to be germinated, and hence upon the time required for germination. We have found it to be especially advantageous to apply the slow-release fertilizer, incorporated uniformly into a polymeric composition of hydroxyethylcellulose or polyacrylic acid, in a dot pattern onto the fiber surface (stencil printing). A full-surface application, such as coating by brushing, caused the product to stiffen, which had a disadvantageous effect in the subsequent processing step.

Slow-release fertilizers of the low-solubility class are especially suitable, particularly those based on crotonylidene diurea, such as triabon, a commercial product of BASF.

Copper(II) oxychloride and calcium sorbate have proved especially resistant to seaming temperatures of up to 400° C.

In addition to those mentioned above, the present invention also has the following advantages: From the processing point of view, there is no more critical substrate mixture. Substrate mixtures of the specifically heavier fertilizer and the specifically lighter substrate could no longer be made sufficiently uniform.

The cultivational advantages reside in that, as germination begins, no salts, for instance fertilizers, come in contact with the seedling. The seed is about 1 cm away from the active coating, that is, from the sleeve containing the fertilizer. The fertilizer reaches the seed after a period of time and thus satisfies the requirement cited above. The slow-release property of the sleeve thus permits a germination system in which no aqueous fertilizer needs to be sprayed on the seedlings.

These advantages are achieved by the core idea of the present invention, namely that of making the sleeve material itself the carrier of the fertilizer.

The following example illustrates the present invention and will enable others skilled in the art to understand it more completely. It should be understood, however, that the invention is not limited solely to the particular example given below. Example:

Using known methods, a wet nonwoven fabric was made from 15.4 g/m$^2$ of bleached cellulose fibers and 6.6 g/m$^2$ of polyacrylonitrile fibers of a staple length of 12 mm and a size of 1.7 dtex by opening the fibers in the pulper, mixing and dispersing them in water to dilution of 0.03%, draining and depositing the fibers on a sloping screen, preliminary consolidation by contactless application of 3.8 g/m$^2$ of acrylate binding agent and 0.2 g/m$^2$ of melamine formaldehyde resin, followed by drying and cross-linking in a moving air dryer at 180° to 190° C., rebonding by application of 0.96 g/m$^2$ of polyvinyl alcohol and 0.08 g/m$^2$ of melamine formaldehyde resin containing cooper(II) oxychloride suspended therein as the fungicide, drying and cross-linking at 180° to 190° C. as above. The time spent in the dryer amounted to 10 seconds each time.

Then followed the preparation of the fertilizer paste: crotonylidene diurea and the thickener hydroxyethyl-cellulose were aspirated into an evacuated mixer in which water had been placed beforehand, and the mixture was stirred in a vacuum so as to drive out air and gases and obtain a uniform mixture having a viscosity of 10,000 cP. The mixture was then applied in dots to the surface of the nonwoven material in the amount of 36 g/m$^2$ by means of a stencil, and the stenciled material was dried at 150° C.

The resulting sheet material was transferred to a special machine which is derived from the machine used in making cigarette paper sleeves. It was cut into strips and formed into sleeves with a 20 mm inside diameter and overlapping longitudinal edges. Each sleeve rested in a horizontal channel and was filled with substrate by means of metering apparatus. This was followed by the bonding together of the overlapping longitudinal edges by brief contact with a runner heated at 350° to 400° C. The filled sleeve was then cut into substrate cartridges 100 mm long which were seeded and covered with substrate.

The seams exhibited no blackening of any kind. The fertilizer was present, ready for use, in the sleeve and did not have to be added afterwards by the user.

While the present invention has been illustrated with the aid of certain specific embodiments thereof, it will be readily apparent to others skilled in the art that the invention is not limited to these particular embodiments, and that various changes and modifications may be made without departing from the spirit of the invention or the scope of the appended claims.

We claim:

1. A sleeve adapted to be filled with a substrate for plant germination, having a tubular shape and consisting of a nonwoven, bonded fiber material having a specific weight of 15 to 50 g/m$^2$, treated with a polymer mass and with amounts of 0.1 to 3 g/m$^2$ of a fungicide, said fiber material comprising 50 to 80 percent by weight of cellulose fibers, 10 to 40 percent by weight of synthetic fibers with a size of 1.3 to 17 dtex, and 10 to 30 percent by weight of a fiber binding agent, said fiber material having an air passage porosity at 1.0 mbar of 1000 to 1600 liters per second per square meter, said polymer mass having 10 to 50 grams per square meter of a slow-release fertilizer with a grain size of less than 80 microns embedded therein.

2. A sleeve of claim 1, where the binding agent is a highly cross-linked acrylate or formaldehyde resin binding agent without an acid cross-linking catalyst.

3. A sleeve of claim 1, where the binding agent is a PVC or EVA copolymer capable of heat-sealing at 140° to 250° C.

4. A sleeve of claim 1, where the binding agent is present in the form of heat-sealing thermoplastic fibers on a copolyester or PVC basis having adhesive properties at 140° to 250° C.

5. A sleeve of claim 1, where the fungicide and the fertilizer are distributed in the binding agent component of the polymer mass.

6. A sleeve of claim 1, where the fertilizer, embedded in printing paste, is imprinted on the fiber material surface in a dot pattern.

7. A sleeve of claim 1, where the fungicide is copper-(II) oxychloride or calcium sorbate.

8. A sleeve of claim 1, where the fertilizer is uniformly distributed in a pattern-printed, polymeric composition of hydroxyethyl-cellulose or polyacrylic acid.

9. A sleeve of claim 1, where the fertilizer is crotonylidene diurea.

* * * * *

UNITED STATES PATENT AND TRADEMARK OFFICE
CERTIFICATE OF CORRECTION

PATENT NO.   :   4,881,344
DATED        :   November 21, 1989
INVENTOR(S)  :   Günter Frey et al It is certified that error appears in the above-identified patent and that said Letters Patent is hereby corrected as shown below:

Column 2, line 25, "40020 C" should read --400°C--.

Column 3, line 64, "makig" should read --making--.

Signed and Sealed this

Twelfth Day of February, 1991

Attest:

HARRY F. MANBECK, JR.

*Attesting Officer*   *Commissioner of Patents and Trademarks*